United States Patent
Suzuki et al.

(10) Patent No.: US 11,845,133 B2
(45) Date of Patent: Dec. 19, 2023

(54) CUTTING TOOL

(71) Applicant: TUNGALOY CORPORATION, Fukushima (JP)

(72) Inventors: Yusuke Suzuki, Iwaki (JP); Katsura Mochizuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 137 days.

(21) Appl. No.: 17/403,944

(22) Filed: Aug. 17, 2021

(65) Prior Publication Data
US 2022/0055119 A1  Feb. 24, 2022

(30) Foreign Application Priority Data

Aug. 21, 2020  (JP) .................... 2020-140009

(51) Int. Cl.
*B23B 29/12* (2006.01)
*B23B 27/16* (2006.01)

(52) U.S. Cl.
CPC .................... *B23B 27/16* (2013.01)

(58) Field of Classification Search
CPC ......... B23B 29/04; B23B 29/12; B23B 29/22; B23B 29/26; B23B 29/244;
(Continued)

(56) References Cited

U.S. PATENT DOCUMENTS 2,734,256 A * 2/1956 Forward et al. ......... B23B 27/16
407/69
2019/0084051 A1* 3/2019 Noureddine ............ B23B 27/04

FOREIGN PATENT DOCUMENTS

EP  2745963 A1 *  6/2014 ............. B23B 27/08
JP  2009083073 A *  4/2009
JP  2011-245594 A   12/2011

OTHER PUBLICATIONS

Schwartz, Eli and Bickford, John H., Handbook of Bolts and Bolted Joints, Chapter 8 Screw Threads, CRC Press (Year: 1998).*
English translation of JP 2009-083073 (Year: 2009).*

* cited by examiner

*Primary Examiner* — Alan Snyder
(74) *Attorney, Agent, or Firm* — Studebaker & Brackett PC

(57) ABSTRACT

Provided is a cutting tool that implements both high positioning accuracy and simple operation when the cutting tool is installed in a tool rest. The cutting has: a tool a main body which includes a fixing seat fixing a cutting insert or a cutting edge; and a position pin, which includes a cylindrical portion that is used for positioning the main body by being abutted to an abutting surface of a tool rest in a case of installing the main body in the tool rest, and which is detachable from the main body. The main body includes a female screw hole that is provided with a female screw portion and a tapered surface that is symmetric with respect to a center axis of the female screw portion and that widens toward an opening thereof. The positioning pin includes a male screw portion that engages with the female screw portion, and a contact portion located at a connecting portion that connects an end of the cylindrical portion and an end of the male screw portion. In a case where the male screw portion is engaged with the female screw portion and the positioning pin is installed in the main body, the contact portion contacts the tapered surface, and a center axis of the cylindrical portion and a center axis of the tapered portion match with each other.

9 Claims, 8 Drawing Sheets

(58) Field of Classification Search
CPC ........ B23B 2260/12; B23B 2260/0482; B23B 27/10; B23B 27/16
See application file for complete search history.

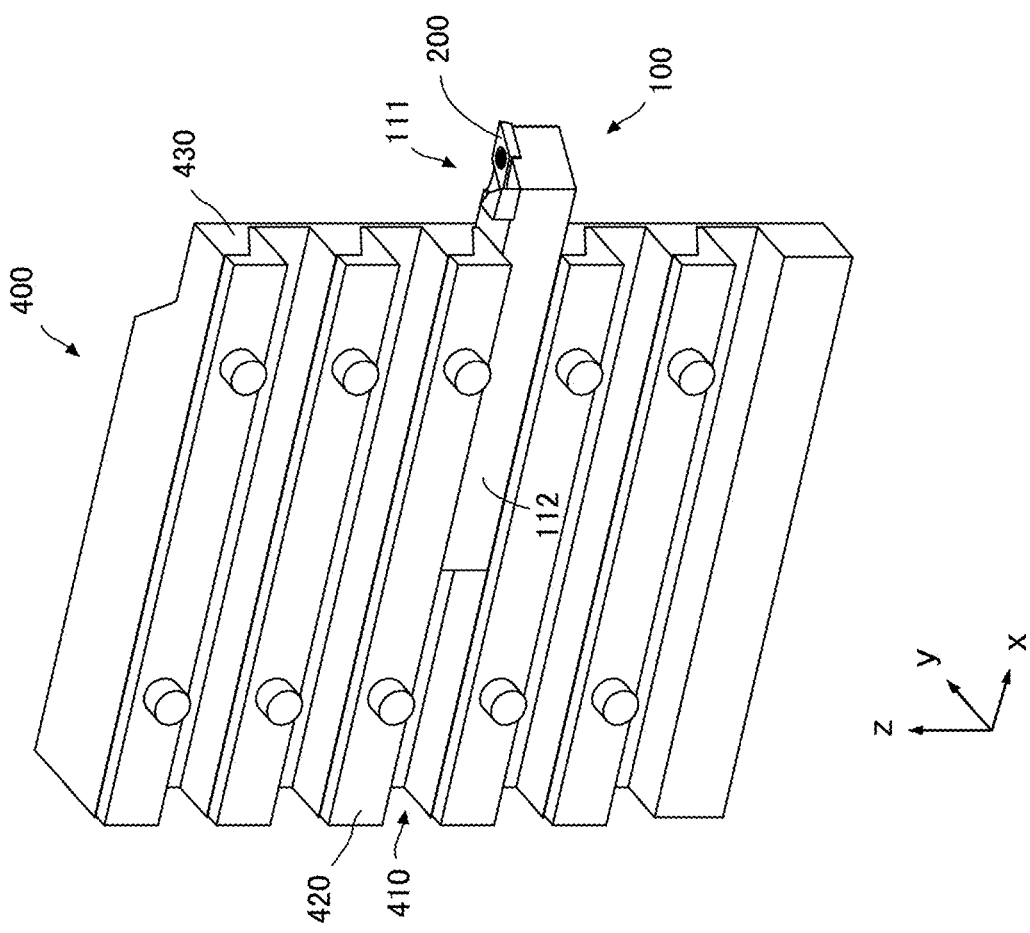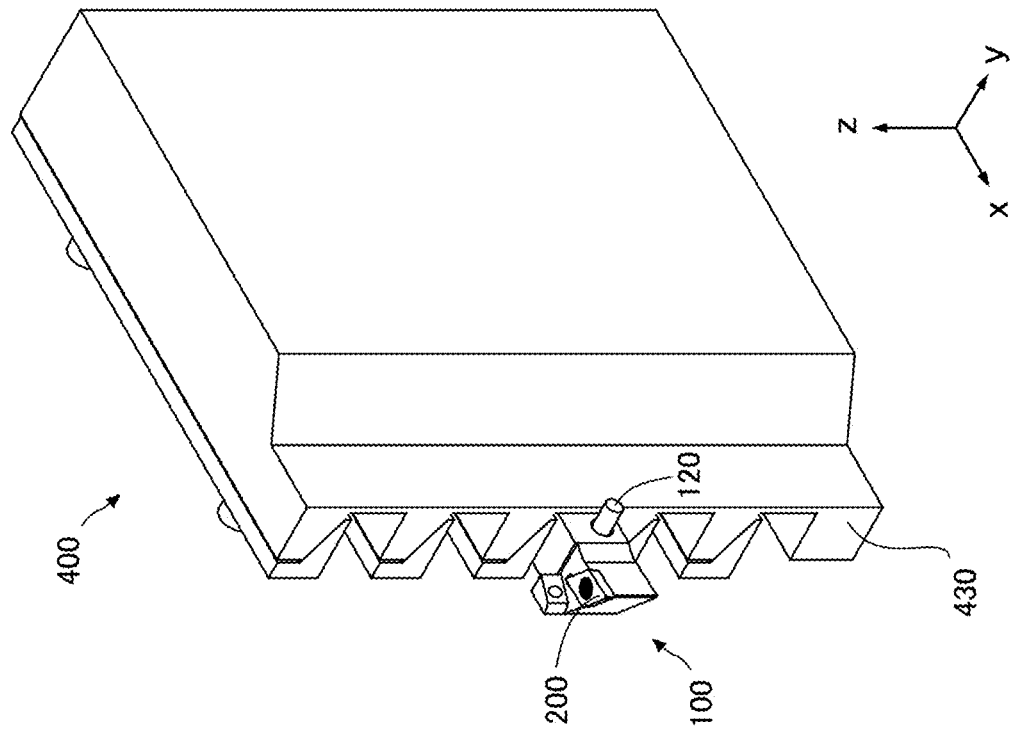

CUTTING TOOL

BACKGROUND

Field

The present invention relates to a cutting tool.

Description of Related Art

A comb-shaped tool rest in which a cutting tool for a lathe is mounted is known. In order to adjust the cutting edge position projected from the tool rest accurately and easily, trial and error have been repeated (e.g. see Patent Publication JP-A-2011-245594).

SUMMARY

According to the technique disclosed in Patent Publication JP-A-2011-245594, a plate-shaped member is installed in a main body by a commonly used screw, and this plate-shaped member is used as a portion of abutting on the tool rest, whereby the projection amount from the tool rest is adjusted. According to this installation method, however, the positioning accuracy is not perfect because of play generated when the screw is tightened. Further, the plate-shaped member is fixed to the main body by passing through a plurality of screws while checking the orientation of the plate member, so each time the screw is tightened, fine adjustment is required, and this operation is tedious.

To solve this problem, the present invention provides a cutting tool that implements both high positioning accuracy and simple operation when the cutting tool is installed in a tool rest.

A cutting tool according to a first aspect of the present invention is a cutting tool including: a main body which includes a fixing seat fixing a cutting insert or a cutting edge; and a positioning pin, which includes a cylindrical portion that is used for positioning the main body by being abutted to an abutting surface of a tool rest in a case of installing the main body in the tool rest and which is detachable from the main body. The main body includes a female screw hole that is provided with a female screw portion and a tapered surface that is symmetric with respect to a center axis of the female screw portion and widens toward an opening thereof. The positioning pin includes a male screw portion that engages with the female screw portion, and a contact portion located at a connecting portion that connects an end of the cylindrical portion and an end of the male screw portion, and in a case where the male screw portion is engaged with the female screw portion and the positioning pin is installed in the main body, the contact portion contacts the tapered surface, and a center axis of the cylindrical portion and a center axis of the tapered surface match with each other.

The present invention can provide a cutting tool that implements both high positioning accuracy and simple operation when the cutting tool is installed in a tool rest.

BRIEF DESCRIPTION OF DRAWINGS

FIG. 8A and FIG. 8B are perspective views depicting a state where the cutting tool is installed in a tool rest.

DETAILED DESCRIPTION

Figure 1:
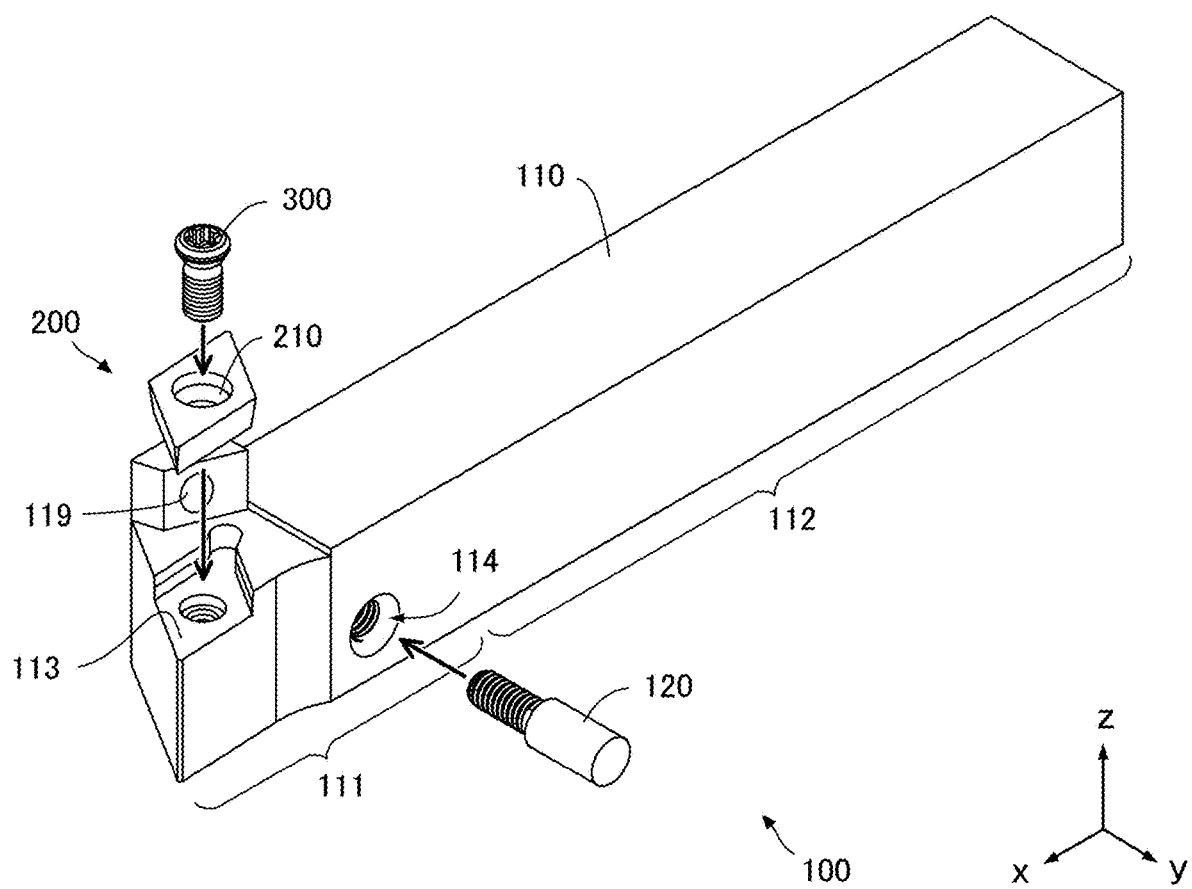
FIG. 1 is a perspective view depicting a cutting tool according to an embodiment, where major elements installed in a main body are separately illustrated.

An embodiment of the present invention will be described with reference to the drawings. In the drawings, composing elements denoted with a same reference sign have a same or similar configuration.

FIG. 1 is a perspective view depicting a cutting tool 100 according to this embodiment, where major elements installed in a main body 110 are separately illustrated. The cutting tool 100 according to this embodiment is a cutting tool for a lathe. The cutting tool 100 is installed in a later mentioned tool rest, and is indirectly mounted on a lathe. In a case where the cutting tool 100 is used with a recommended value of a projection amount from the tool rest to the cutting edge, a positioning pin 120 is mounted on the main body 110, and is used for positioning. In a case where the projection amount up to the cutting edge is arbitrarily adjusted, the cutting tool 100 is installed in the tool rest in a state of the positioning pin 120 that is removed from the main body 110. In the following description, it is assumed that the recommended value is used for the projection amount from the tool rest to the cutting edge, and [the cutting tool 100] is used in a state of the positioning pin 120 that is mounted on the main body 110. The positioning pin 120 functions as a positioning member when the cutting tool 100 is installed in the tool rest.

The main body 110 has: a head portion 111 in which a cutting insert 200 is installed; and a shank portion 112, which is a handle portion to be fixed in a tool rest or a chuck of a lathe. The head portion 111 includes a concave-shaped fixing seat 113 so that the cutting insert 200 can be placed and installed. The cutting insert 200 is a rhombic-shaped replaceable cutting edge chip, as illustrated in FIG. 1, for example. The cutting insert 200 is placed on the fixing seat 113 and is fixed to the fixing seat 113 by a fixing screw 300 that penetrates a through hole 210, which is disposed around the center of the cutting insert 200.

When a cutting insert 200 has been used for a certain period and the cutting capability thereof drops, the cutting insert 200 is removed from the fixing seat 113, and is replaced with another cutting insert 200. In the description of this embodiment, a rhombic-shaped cutting insert 200 is installed in the cutting tool 100, but a different-shaped cutting insert, such as a triangular-, rectangular- or circular-shaped cutting insert, may be installed in the cutting tool. Further, the present invention is not limited to the replaceable type where the cutting insert 200 is detachably installed in the cutting tool 100, but the cutting edge may be integrated with the front end of the head portion 111 of the cutting tool.

When a surface of the head portion 111, where the fixing seat 113 is disposed, is an upper face, a female screw hole 114, to which the positioning pin 120 is inserted and installed, is formed in one side face. The structures of the positioning pin 120 and the female screw hole 114 will be described later. The shank portion 112 in general is rectangular parallelepiped bar-shaped, and an inner passage through which coolant flows is disposed inside the shank portion 112. The coolant is ejected from an ejection port 119, which is connected with the inner passage, toward the cutting edge of the cutting insert 200.

As indicated in FIG. 1, x axis, y axis and z axis are determined for the main body 110. That is, the longitudinal direction of the main body is the x axis direction, the direction of inserting the positioning pin 120 into the female screw hole 114 is the y axis direction, and the direction of placing the cutting insert 200 is the z axis direction. The same coordinate axes are indicated in other drawings with respect to the position of the main body 110, so as to indicate the orientation of the structure illustrated in each drawing.

Figure 2:
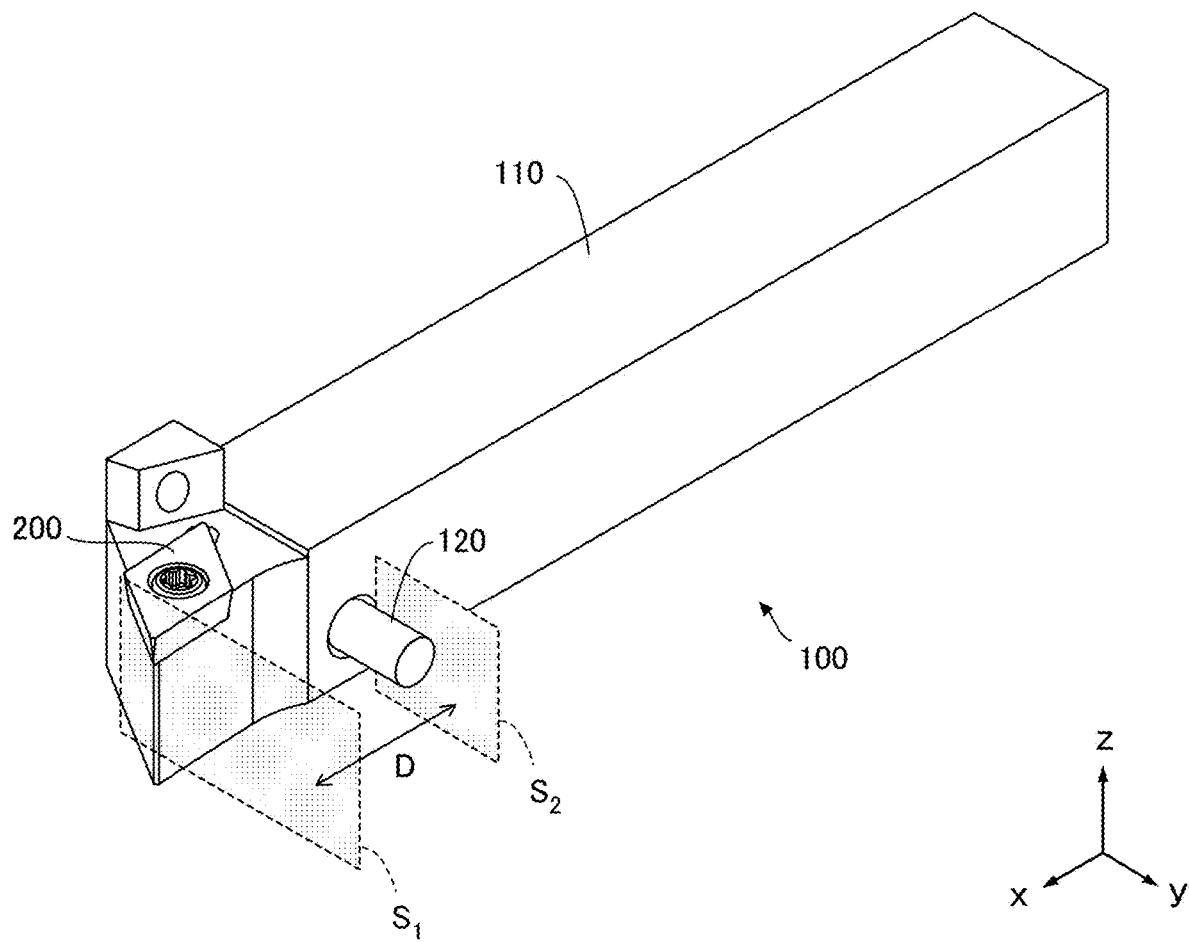
FIG. 2 is a perspective view depicting the cutting tool in a state where the major elements are installed.

FIG. 2 is a perspective view depicting the cutting tool 100 in a state where the major elements are installed. Specifically, FIG. 2 indicates a state where the cutting insert 200 and the positioning pin 120 are installed and fixed in the main body 110. As described later, the positioning pin 120 is accurately fixed to a predetermined fixing position with respect to the main body 110. Then out of a plane that is parallel with the yz plane, a distance D between two surfaces of a virtual plane $S_1$ that contacts the cutting edge of the cutting insert 200 and a predetermined abutting surface $S_2$ of the tool rest that contacts the positioning pin 120 is stably determined. This distance D between the two surfaces is a recommended value that is predetermined as the projection amount from the tool rest to the cutting edge. In other words, in the case where the cutting tool 100 is fixed to the tool rest, the projection amount from the tool rest to the cutting edge can be accurately adjusted to the recommended value.

Figure 3:
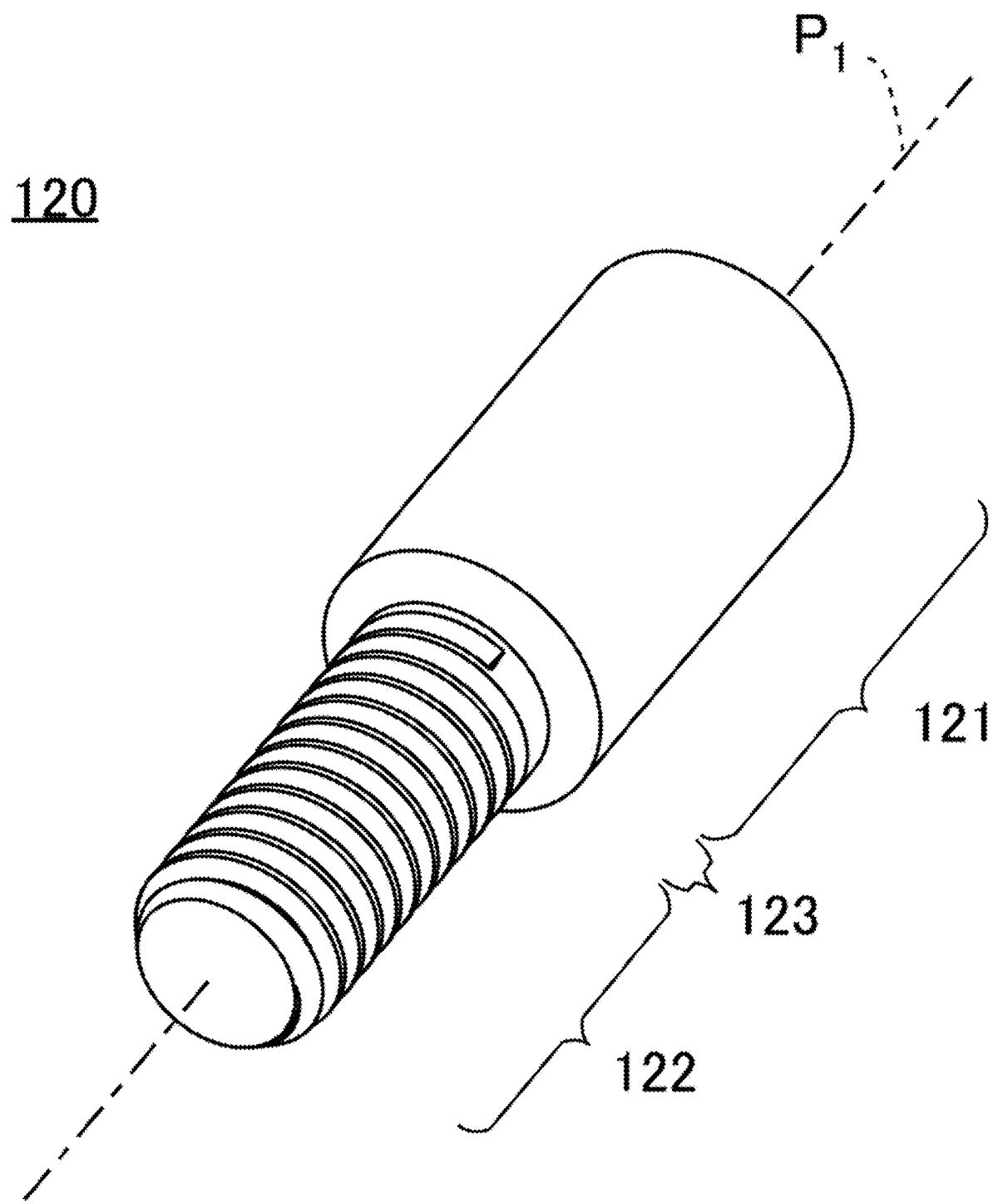
FIG. 3 is a perspective view of a positioning pin.

FIG. 3 is a perspective view of the positioning pin 120. The positioning pin 120 is constituted of a cylindrical portion 121, a male screw portion 122 and a connecting portion 123. The cylindrical portion 121 is disposed on a first end side of the positioning pin 120, and has a cylindrical surface at a predetermined radius from the center axis $P_1$ of the positioning pin 120. The male screw portion 122 is disposed on a second end of the positioning pin 120, which is on the opposite side of the first end where the cylindrical portion 121 is disposed, and includes a screw thread which engages with a later mentioned female screw portion. The radius of the cylindrical surface of the cylindrical portion 121 is larger than the height of the screw thread of the male screw portion 122 from the center axis $P_1$. The connecting portion 123 is an intermediate portion that connects the end of the cylindrical portion 121 on the side of the male screw portion 122 and the end of the male screw portion 122 on the side of the cylindrical portion 121.

Figure 4:
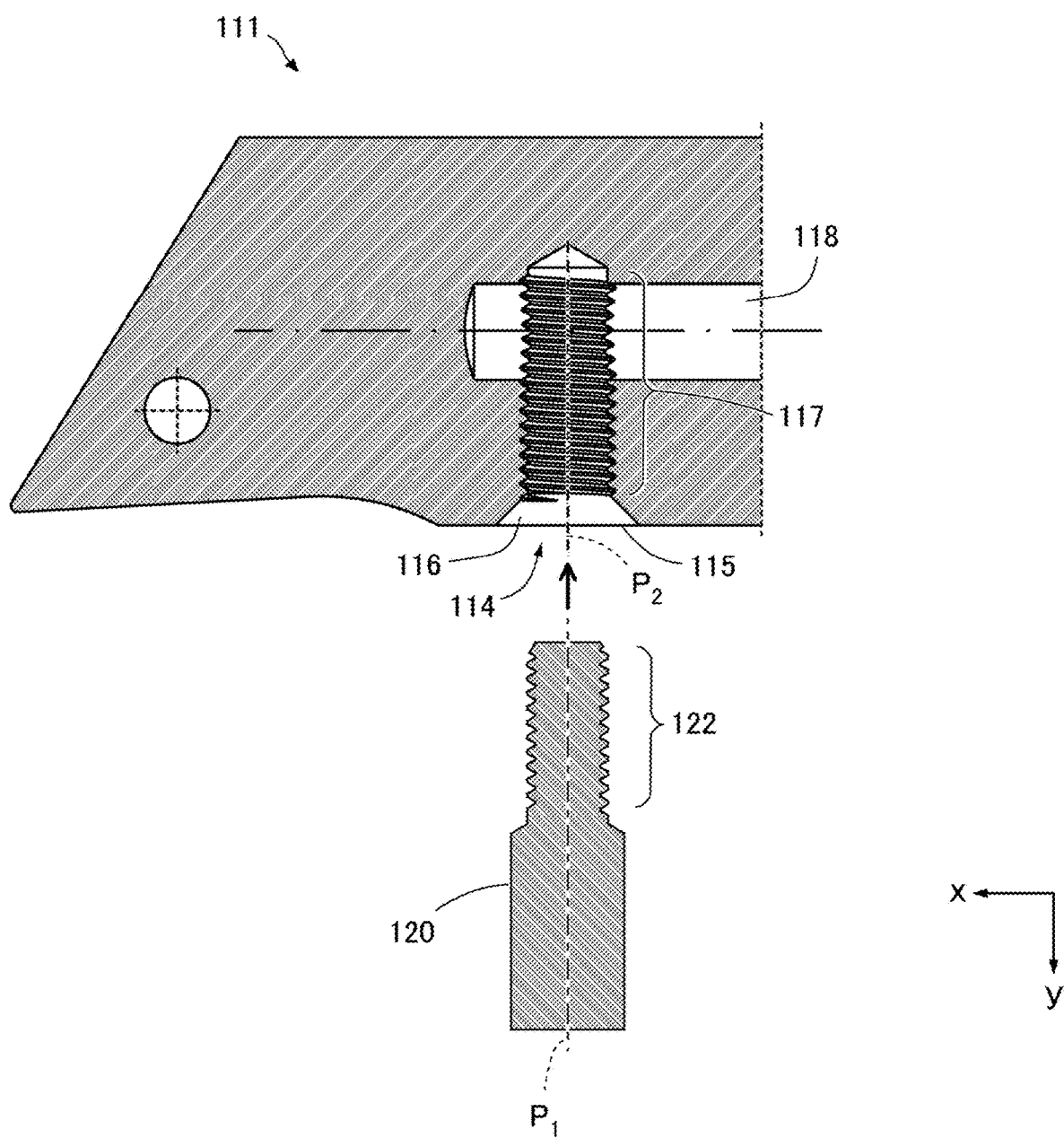
FIG. 4 is a cross-sectional view depicting a state of installing the positioning pin.

FIG. 4 is a cross-sectional view depicting a state of installing the positioning pin 120 in the head portion 111. Specifically, FIG. 4 is a cross-sectional view of the positioning pin 120 illustrated in FIG. 1 sectioned at the xy plane that includes the center axis $P_1$. As illustrated, the female screw hole 114 that extends in the y axis direction is disposed in the head portion 111.

The female screw hole 114 includes: a tapered surface 116 that is formed inward from a circular opening 115 which opens on the surface of the head portion 111 to a predetermined depth while decreasing the diameter thereof; and a female screw portion 117 that is formed further inward from the end of the tapered surface 116. The tapered surface 116 is a truncated cone-shaped surface in this embodiment, but need not be a truncated cone-shaped surface as long as the surface is inclined symmetrically with respect to the center axis $P_2$ of the female screw portion 117 and the diameter thereof gradually decreases in the inward direction (that is, an inclined surface that opens toward the opening 115).

The female screw portion 117 is a screw groove that engages with the male screw portion 122. A part of the inner passage 118, through which the coolant flows, reaches inside the head portion 111, and intersects with an inner part of the female screw hole 114 so as to connect with each other.

Figure 5:
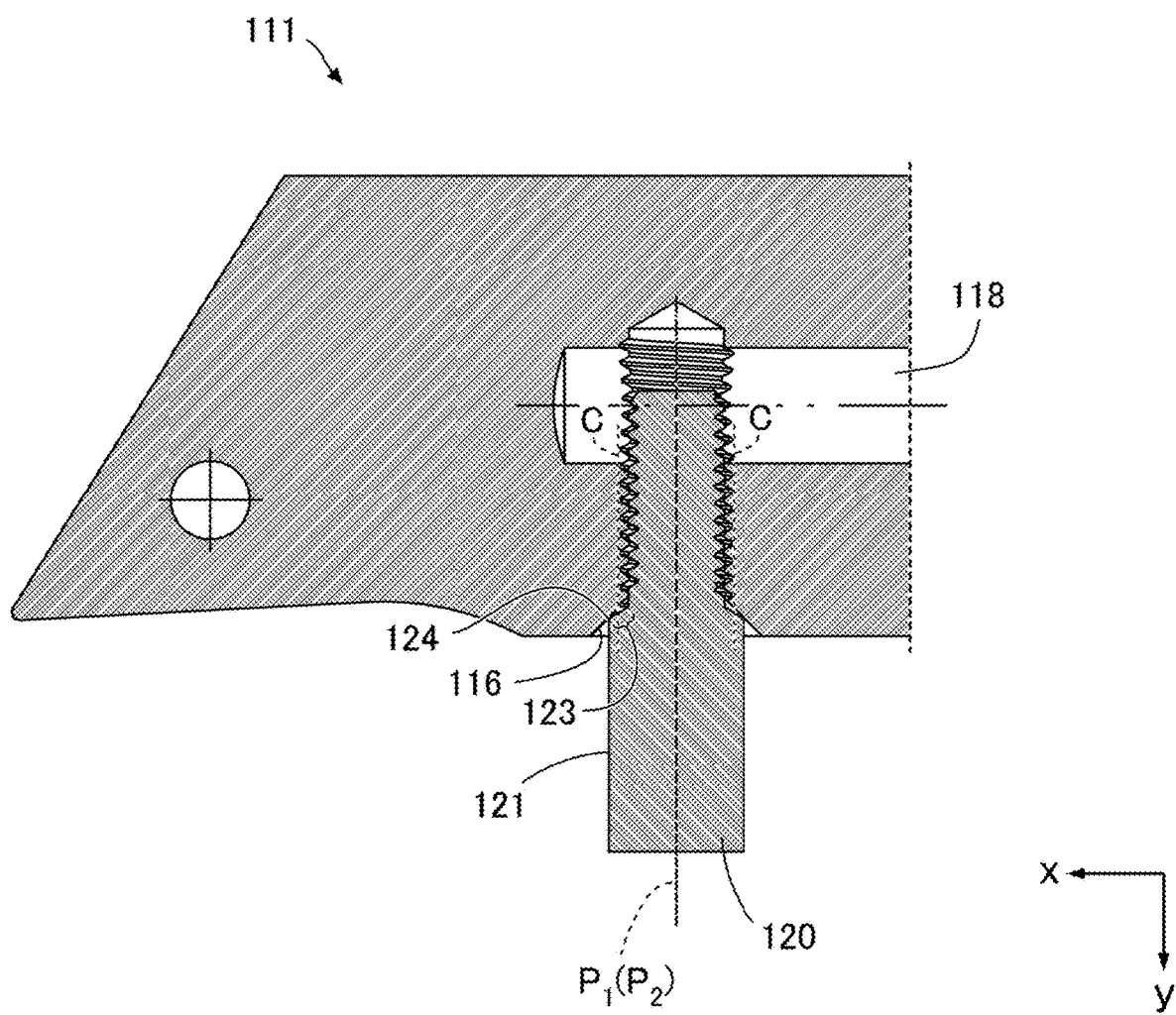
FIG. 5 is a cross-sectional view depicting a state where the positioning pin is installed.

FIG. 5 is a cross-sectional view depicting a state where the positioning pin 120 is installed in the head portion 111. Specifically, FIG. 5 is a state where the positioning pin 120 in the state of FIG. 4 is inserted into the female screw hole 114.

As the male screw portion 122 of the positioning pin 120 is screwed into the female screw portion 117 of the female screw hole 114, a contact portion 124, which is the end of the connecting portion 123 and is a boundary portion with the cylindrical portion 121, eventually contacts with the tapered surface 116 of the female screw hole 114. The tapered surface 116 is an inclined surface that is symmetric with respect to the center axis $P_2$ of the female screw hole 114. The contact portion 124, which is a boundary portion with the cylindrical portion 121, is a circumference centered around the center axis $P_1$ of the positioning pin 120. Therefore when the positioning pin 120 is inserted into the female screw hole 114, the center axis $P_1$ of the positioning pin 120 naturally aligns with the center axis $P_2$ of the female screw hole 114, and the distance of the cylindrical surface of the cylindrical portion 121 to the center axis $P_2$ of the female screw hole 114 becomes the same. In other words, the operator can form an accurate positioning portion with respect to the main body 110 merely by inserting the positioning pin 120 into the female screw hole 114.

The female screw portion 117 contacts with the male screw portion 122 such that force is applied in the inserting direction (center axis direction), and does not contact with the male screw portion 122 in the diameter direction. In other words, the depth of the screw groove of the female screw portion 117 is set to be deeper than the height of the screw thread of the male screw portion 122, so that alignment is not interrupted by contact of the female screw portion 117 and the male screw portion 122 in the diameter direction.

When the contact portion 124 contacts with the tapered surface 116, the internal space is sealed by the contact portion 124. In other words, even if the space between the male screw portion 122 and the female screw portion 117 is connected with the inner passage 118, the coolant that flows through the inner passage 118 does not leak out of the contact portion 124. Therefore even if the inner passage 118 is disposed in a complex way inside the main body 110, the female screw hole 114 may be formed at a required location. In other words, the inner passage 118 can be disposed without the need of avoiding the female screw hole 114 that is set, which makes designing flexible.

In this embodiment, the tapered surface 116 is divided to two regions by a cross line, where a tangential line C, connecting the deepest part of the screw groove of the female screw portion 117, intersects with the tapered surface 116. Out of these two regions, the contact portion 124 contacts with the tapered surface 116 in a region on the side of the opening 115.

Figure 6:
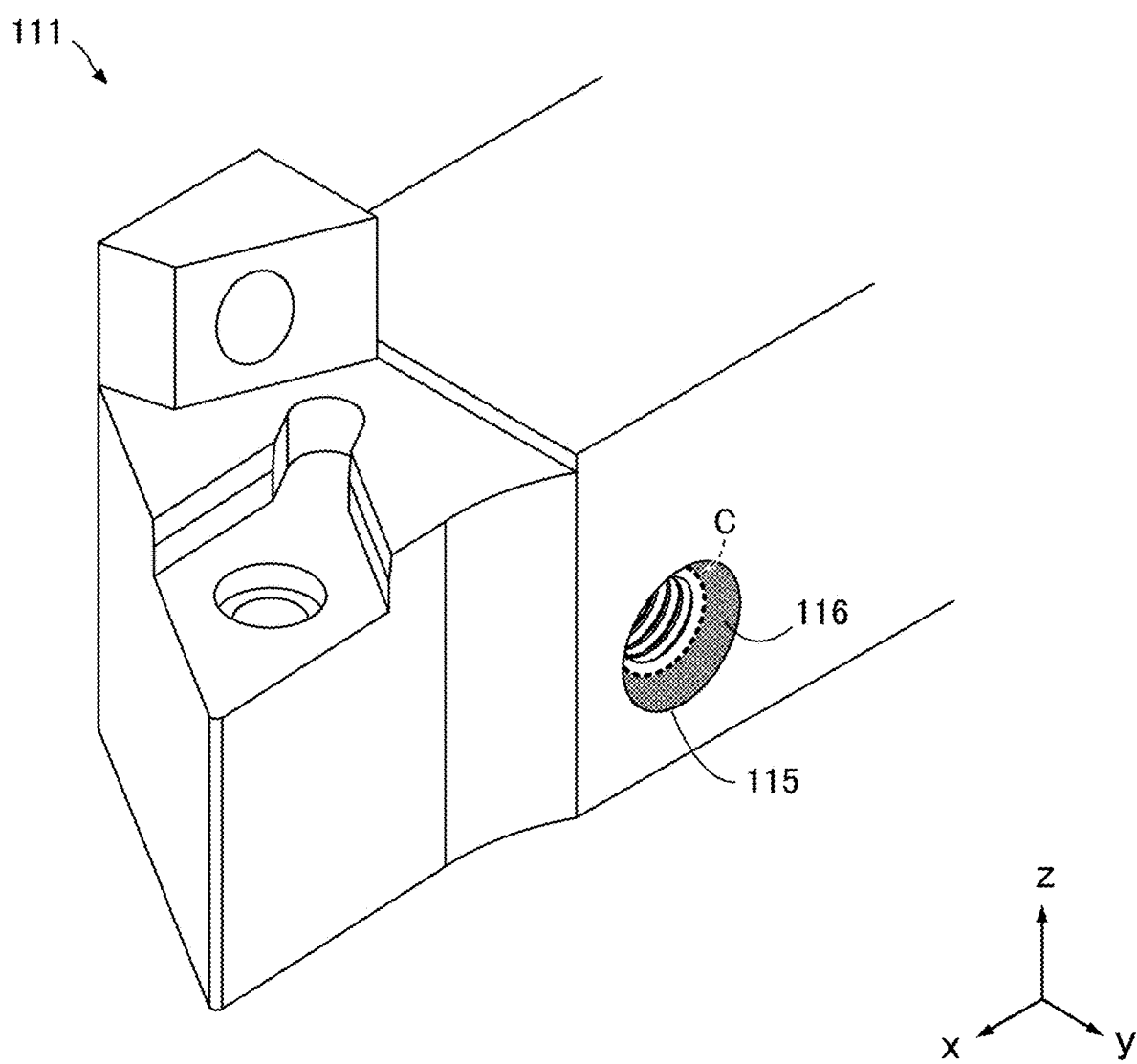
FIG. 6 is a perspective view of a head portion.

FIG. 6 is a perspective view of the head portion 111. The tangential line C indicated in FIG. 5 intersects with the tapered surface 116 and forms a virtual circle (cross line mentioned above) which corresponds to the maximum outer diameter of the female screw portion 117 on the tapered surface 116. Then the contact portion 124 contacts the shaded region on the side of the opening 115. If the contact portion 124 contacts in this region, the alignment function can be performed more stably. In other words, the center axis $P_1$ of the positioning pin 120 can be matched with the center axis $P_2$ of the female screw hole 114 more accurately.

Figure 7A:
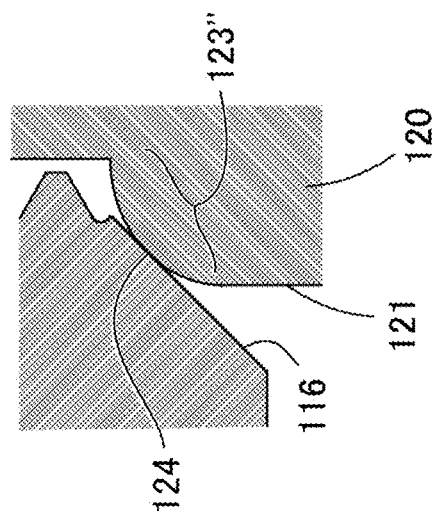
FIG. 7A to FIG. 7C are diagrams for describing variations of a connecting portion.
Figure 7B:
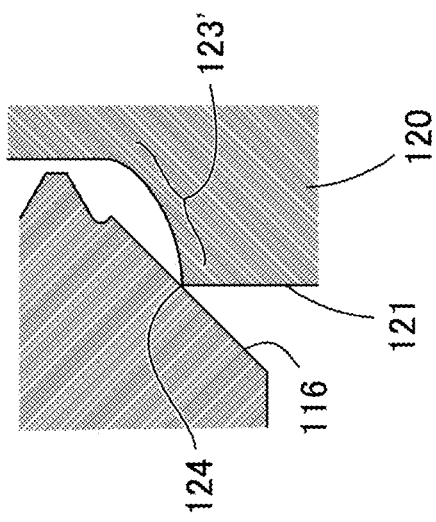
Figure 7C:
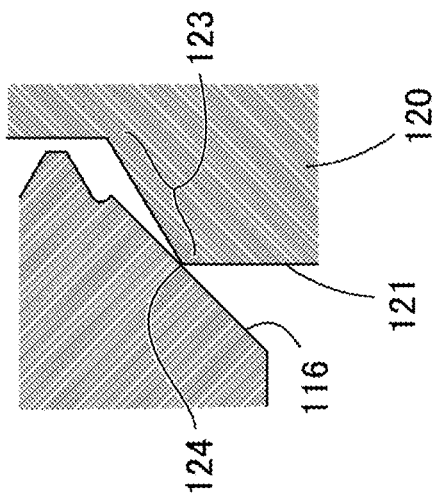

FIG. 7A to FIG. 7C are diagrams for describing variations of the connecting portion of the positioning pin 120. Specifically, FIG. 7A to FIG. 7C are enlarged cross-sectional views of a vicinity of the contact portion 124. FIG. 7A indicates an example of this embodiment described above. The connecting portion 123 has a truncated cone-shaped surface, just like the tapered surface 116, but the inclination angle of the truncated cone of the connecting portion 123 is larger than the inclination angle of the truncated cone of the tapered surface 116, so that the boundary portion with the cylindrical portion 121 becomes the contact portion 124.

FIG. 7B indicates an example of the connecting portion according to another embodiment. The contact portion 124 is at the boundary portion with the cylindrical portion 121, just like the example in FIG. 7A, but the connecting portion 123' is formed to be a concaved curved surface. With this shape as well, the contact portion 124 can be stably contacted to the tapered surface 116.

FIG. 7C indicates an example of the connecting portion according to still another embodiment. The connecting portion 123" is formed to be a convex curved surface of which plane that is perpendicular to the center axis $P_1$ is a circle. In this case, the contact portion 124 is not at the boundary portion with the cylindrical portion 121, but is located in a vicinity of the intermediate portion of the connecting portion 123". This contact portion 124 can implement a smooth alignment function.

FIG. 8A and FIG. 8B are perspective views depicting a state where the cutting tool 100, in which the cutting insert 200 is installed, is installed in the tool rest 400. FIG. 8A is a perspective view from a side where the positioning pin 120 can be observed, and FIG. 8B is a perspective view from the opposite side thereof.

The cutting tool 100 is placed on a mounting groove 410 and is slid, then the fixed positioning pin 120 contacts an abutting surface 430 of the tool rest 400, and the position of the cutting tool 100 with respect to the tool rest 400 is determined. When the shank portion 112 is tightened by a mounting member 420 in this state, the cutting tool 100 is fixed to the tool rest 400. When the abutting surface 430 (scheduled abutting surface $S_2$ in FIG. 2) and the cylindrical portion 121 of the positioning pin 120 are contacted and fixed, the distance D up to the cutting edge of the cutting insert 200 is accurately determined, as described with reference to FIG. 2.

In a case of setting a plurality of recommended values for the distance up to the cutting edge, a plurality of positioning pins 120 each of which includes a cylindrical portion 121 having a cylindrical diameter matching with each recommended value, may be provided as a set in advance, so that the operator can select and install a desired positioning pin 120 in the main body 110. In this case, a step difference may be formed between the connecting portion 123 and the cylindrical portion 121 so that the contact portion 124 need not be located at the boundary with the cylindrical portion 121. In other words, the shape of the connecting portion 123 may be determined so that the contact portion 124 is located at a predetermined position with respect to the tapered surface 116, regardless the diameter of the cylindrical portion 121.

In a case of fixing the cutting tool 100 to the tool rest 400 with a projection amount that is not a recommended value, the operator removes the positioning pin 120, adjusts the cutting edge position by sliding the cutting tool 100 on the mounting groove 410, and tightens the shank portion 112 using the mounting member 420. In other words, the projection amount is adjusted without using the abutting surface 430.

In a case of fixing the projection amount to a recommended value again after arbitrarily adjusting the projection amount like this and performing the processing operation, the positioning pin 120 is installed in the main body 110 and is abutted to the abutting surface 430, whereby accurate positioning can be implemented. In other words, according to the cutting tool 100 of this embodiment, both high positioning accuracy and simple operation can be implemented.

What is claimed is:

1. A cutting tool comprising:
    a main body which includes a fixing seat fixing a cutting insert or a cutting edge; and
    a positioning pin, which includes a cylindrical portion that is used for positioning the main body by being abutted to an abutting surface of a tool rest while the main body is installed in the tool rest, and which is detachable from the main body, wherein
    the main body includes a female screw hole that is provided with a female screw portion and a tapered surface that is symmetric with respect to a center axis of the female screw portion and widens toward an opening thereof,
    the positioning pin includes:
        a male screw portion that engages with the female screw portion,
        a connecting portion that connects an end of the cylindrical portion and an end of the male screw portion, and
        a contact portion positioned at an outermost location of the connecting portion,
    while the male screw portion is engaged with the female screw portion and the positioning pin is installed in the main body, the contact portion contacts the tapered surface, and a center axis of the cylindrical portion and a center axis of the tapered surface match with each other, and
    a depth of a screw groove of the female screw portion is set deeper than a height of a screw thread of the male screw portion, so that when the contact portion contacts the tapered surface, the male screw portion and the female screw portion do not contact each other in a radial direction.

2. The cutting tool according to claim 1, wherein the contact portion contacts the tapered surface in a region outside a virtual circle, which corresponds to a maximum outer diameter of the female screw portion.

3. The cutting tool according to claim 1, wherein the main body includes an inner passage through which coolant flows, and the female screw hole is connected with the inner passage in a part on an opposite side to the opening.

4. The cutting tool according to claim 1, wherein the connecting portion is formed as a taper, and the contact portion is formed at an intersection between the connecting portion and the cylindrical portion.

5. The cutting tool according to claim 1, wherein the diameter of the cylindrical portion is the same as the diameter of the contact portion.

6. The cutting tool according to claim 1, wherein the connecting portion includes a convex surface.

7. The cutting tool according to claim 1, the tapered surface of the female screw hole including an innermost location and an outermost location, and the contact portion contacts the tapered surface at a position between the innermost location and the outermost location.

8. The cutting tool according to claim 1, the main body including a main body surface, the tapered surface of the female screw hole extending inwardly from the main body surface, and the cylindrical portion extending outwardly from a location between the main body surface and the female screw portion.

9. A cutting tool comprising:
   a main body which includes a fixing seat fixing a cutting insert or a cutting edge; and
   a positioning pin, which includes a cylindrical portion that is used for positioning the main body by being abutted to an abutting surface of a tool rest while the main body is installed in the tool rest, and which is detachable from the main body, wherein
   the main body includes a female screw hole that is provided with a female screw portion and a tapered surface that is symmetric with respect to a center axis of the female screw portion and widens toward an opening thereof,
   the positioning pin includes:
      a male screw portion that engages with the female screw portion,
      a connecting portion that connects an end of the cylindrical portion and an end of the male screw portion, the connecting portion includes a convex surface, and
      a contact portion positioned on the convex surface at a location between the male screw portion and the end of the cylindrical portion,
   while the male screw portion is engaged with the female screw portion and the positioning pin is installed in the main body, the contact portion contacts the tapered surface, and a center axis of the cylindrical portion and a center axis of the tapered surface match with each other, and
   a depth of a screw groove of the female screw portion is set deeper than a height of a screw thread of the male screw portion, so that when the contact portion contacts the tapered surface, the male screw portion and the female screw portion do not contact each other in a radial direction.

* * * * *